(12) United States Patent
Braeger

(10) Patent No.: US 9,888,697 B2
(45) Date of Patent: Feb. 13, 2018

(54) METHOD AND DEVICE FOR AUTOMATICALLY EXTRACTING FLESH FROM FISH

(71) Applicant: NORDISCHER MASCHINENBAU RUD. BAADER GMBH + CO. KG, Lubeck (DE)

(72) Inventor: Horst Braeger, Lubeck (DE)

(73) Assignee: Nordischer Maschinenbau Rud. Baader GmbH + Co. KG, Lubeck (DE)

( * ) Notice: Subject to any disclaimer, the term of this patent is extended or adjusted under 35 U.S.C. 154(b) by 0 days.

(21) Appl. No.: 15/116,477

(22) PCT Filed: Feb. 3, 2014

(86) PCT No.: PCT/EP2014/051999
§ 371 (c)(1),
(2) Date: Aug. 3, 2016

(87) PCT Pub. No.: WO2015/113639
PCT Pub. Date: Aug. 6, 2015

(65) Prior Publication Data
US 2017/0006884 A1    Jan. 12, 2017

(51) Int. Cl.
*A22C 25/00* (2006.01)
*A22C 25/16* (2006.01)

(52) U.S. Cl.
CPC ............ *A22C 25/166* (2013.01); *A22C 25/16* (2013.01); *A22C 25/163* (2013.01)

(58) Field of Classification Search
CPC ....... A22C 25/00; A22C 25/14; A22C 25/145; A22C 25/147
(Continued)

(56) References Cited

U.S. PATENT DOCUMENTS 3,525,120 A    8/1970  Jobmann
3,908,230 A *  9/1975  Hartmann ............. A22C 25/16
                                                       452/135
(Continued)

FOREIGN PATENT DOCUMENTS

CN    102228071 A    11/2011
DE      2248536 A1    4/1974
(Continued)

OTHER PUBLICATIONS

Office Action dated May 4, 2017 from Chinese Patent Application No. CN201480076528.5 filed Feb. 3, 2017.
(Continued)

*Primary Examiner* — Richard Price, Jr.
(74) *Attorney, Agent, or Firm* — Sunstone IP

(57) ABSTRACT

The invention relates to a method for mechanically recovering flesh from fish, in which by introducing incisions, the dorsal bones and the ventrally directed bones are cut free from the laterally located fillets without separating the pin bones from the spine and the separating gaps formed by the incisions are then expanded, thereby moving the lateral fillets away from the spine of the fish in the lateral direction transverse to the dorsal bones, wherein the fillets are peeled away from the pin bones extending laterally out from the spine or the flank bones, and a corresponding apparatus for mechanically recovering the flesh of fish.

21 Claims, 5 Drawing Sheets

(58) Field of Classification Search
USPC .............. 452/149–153, 155, 156, 160, 161
See application file for complete search history.

(56) References Cited

U.S. PATENT DOCUMENTS

| | | | |
|---|---|---|---|
| 4,037,294 A | 7/1977 | Cowie et al. | |
| 4,236,275 A * | 12/1980 | Westerdahl | A22C 25/16 452/135 |
| 4,365,387 A * | 12/1982 | Hartmann | A22C 25/16 452/161 |
| 4,976,011 A * | 12/1990 | Ogawa | A22C 25/14 452/110 |
| 5,554,069 A * | 9/1996 | Burch | A22C 25/145 452/149 |
| 5,871,395 A * | 2/1999 | Grabau | A22C 25/166 452/161 |
| 5,980,376 A * | 11/1999 | Grosseholz | A22C 25/147 452/109 |
| 6,280,313 B1 * | 8/2001 | Braeger | A22C 25/16 452/161 |
| 6,322,437 B1 * | 11/2001 | Grabau | A22C 25/16 452/135 |
| 7,090,574 B2 * | 8/2006 | Braeger | A22C 25/16 452/161 |
| 7,427,229 B2 * | 9/2008 | Grosseholz | A22C 25/147 452/106 |
| 7,927,194 B2 * | 4/2011 | Jurs | A22C 25/16 452/135 |
| 8,298,050 B2 * | 10/2012 | Jurs | A22C 25/16 452/162 |
| 8,814,637 B2 * | 8/2014 | Jurs | A22C 25/16 452/162 |
| 8,956,205 B2 * | 2/2015 | Kowalski | A22C 25/14 452/135 |

FOREIGN PATENT DOCUMENTS

| | | |
|---|---|---|
| DE | 2912982 C2 | 7/1981 |
| DE | 3518960 C1 | 2/1986 |
| DE | 3632561 C2 | 5/1988 |
| DE | 20014211 U1 | 2/2001 |
| DE | 10116248 A | 10/2002 |
| DE | 10303519 B3 | 8/2004 |
| DE | 102012015242 A1 | 2/2014 |
| EP | 0693256 B1 | 4/1998 |
| JP | 2005-34042 A | 2/2005 |

OTHER PUBLICATIONS

International Preliminary Report on Patentability dated Aug. 9, 2016 from International Patent Application No. PCT/EP2014/051999 filed Feb. 3, 2014.

International Search Report dated Oct. 10, 2014 from International Patent Application No. PCT/EP2014/051999 filed Feb. 3, 2014.

* cited by examiner

METHOD AND DEVICE FOR AUTOMATICALLY EXTRACTING FLESH FROM FISH

CROSS REFERENCE TO RELATED APPLICATION

This application is a National Stage of International Patent Application No. PCT/EP2014/051999 filed on Feb. 3, 2014, the disclosure of which is hereby incorporated entirely herein by reference.

BACKGROUND

Technical Field

The invention relates to a method and an apparatus for mechanically recovering flesh from slaughtered fish with opened abdominal cavity, particularly from fish species having pin bones extending from the spine into the fish flesh, for example salmon (salmo solar) or white fish.

State of the Art

It is known for recovering fillets from fish to cut the ventral and dorsal spokes or bones of the fish up to the vertebrae of the spine both from above and also from below by means of two rotating circular blade pairs spaced apart, to cut free the fillets in the region of the abdominal cavity by means of rib incisions from the lateral vertebral processes and ribs or flank bones, and to separate them completely from the bone structure by separating the meat strip from the tail root to behind the abdominal cavity. A filleting machine for carrying out this method, in which a conveyor that is fitted at intervals with sliding saddles for receiving the slaughtered fish conveys the fish tail-first through a processing area, is disclosed in DE 29 12 982 C2. To carry out an effective filleting process, in which pin-bone-free fillets should be recovered from fish of the type described above, a method is proposed in DE 22 48 536 A in which, after carrying out the dorsal incisions and scraping of the flesh from the vertebral processes, the flesh is scraped off closely above the pin bones and is then separated from the ribs and if necessary the ventral spokes.

A further apparatus for manufacturing pin-bone-free fish fillets is disclosed in DE 35 18 960 CI. During the filleting process, circular knives are used to make lateral incisions essentially perpendicular to the plane of symmetry of the fish above the pin bones up to the dorsal spokes as a result of which, in continuing the filleting process, the boneless fillets and the ventral flaps arise separately. Finally, an apparatus for recovering pin-bone-free fish fillets is disclosed in DE 36 32 561 C2 in which during filleting two rotating circular knives spaced apart from each other make two incisions above and below the pin bones running approximately perpendicular to the plane of symmetry of the fish up to the ribs or the lateral vertebral processes. A burin knife which fills the intermediate space between the pin bone knives separates out the meat strips containing the pin bones. In this way, fillets are obtained that are free of pin bones and other bones but to which the ventral flap adheres. This is undesirable during the recovery of pin-bone-free fish fillets.

In contrast to the known methods for recovering pin-bone-free fish fillets in which the pin bones are separated from the spine and are then removed in a separate work operation, DE 101 16 248 A proposes a method for filleting slaughtered fish with opened abdominal cavity in which the pin bones are left on the spine and in a separate work step are drawn out of the fish flesh while exerting relative deformation forces between the pin bones and the flesh regions surrounding them. During the process, the pin bones are pushed out of their originally upright position, essentially perpendicular to the spine, towards the spine until they assume a position approximately parallel to it. Due to this deformation and associated load on the pin bones, there is a risk that the pin bones will be detached from the spine and will break away from it while being drawn out of the fish flesh. As a result, the pin bones remain completely or partially in the fish flesh which means a reduction in the quality of the fish fillets obtained.

According to effective fish processing technologies, the object of the invention is therefore to supplement and further develop the known filleting and deboning methods in such a manner that, as a result of the processing procedure, a pin-bone-free fish fillet emerges without any fish bone remnants in the fish flesh and without damage to the fish flesh.

This object is achieved by a method having the features indicated in claim 1 and by an apparatus having the features indicated in claim 9. Preferred embodiments emerge from the associated dependent claims in addition to the following description and the accompanying figures.

SUMMARY

The method according to the invention is used for mechanically recovering flesh from fish, i.e. for filleting fish. According to this method, the dorsal bones and the ventrally directed bones are initially cut free from the laterally located fillets by the introduction of incisions. This is basically known from the mechanical filleting of fish. Viewed in the swimming position of the fish, the dorsal bones extend essentially in the vertical direction. In the tail region of the fish, the ventrally directed bones also extend essentially in the vertical direction. Lateral to the abdominal cavity, the bones extend essentially obliquely downward. The fillets are located on both sides outside the bones, i.e. on the outer sides of the bones and spine directed away from each other. According to the invention, the incisions are introduced such that any pin bones present, which extend into the flesh transverse to the dorsal bones, are not separated from the spine or, in the case of white fish, from the flank bones extending away from the spine. That is to say, the pin bones remain connected to the spine and stick in the flesh of the fillets after the incisions have been introduced.

In the next step, according to the invention the separating gaps formed between the said bones and the flesh of the fillets are widened. That is to say, the separating gaps are widened in a direction transverse to the dorsal bones and transverse to the longitudinal extension of the fish which runs in the direction of its spine. In the process, the fillets located to the side of the spine are moved laterally away from the spine of the fish, i.e. in a direction transverse to the longitudinal extension of the spine and transverse to the dorsal bones. At the same time, the fillets located on both sides of the spine are moved apart. During this sideways movement the fillets are peeled away from the pin bones extending laterally away from the spine or the flank bones. That is to say, as a result of the relative movement laterally between fillets and spine, the pin bones remaining on the spine or on the flank bones are drawn out of the flesh. Thus a boneless fillet is created and all bones remain on the spine.

Preferably two dorsal incisions extending in the longitudinal direction of the slaughtered fish with opened abdominal cavity and cutting free the dorsal bones in the region of the fish back, two flank incisions cutting free the flank bones in the region of the abdominal cavity and two separating incisions reaching from the tail end up to the end of the abdominal cavity, extending in the longitudinal direction of the fish and cutting free the ventrally directed bones are introduced as incisions in the slaughtered fish with opened abdominal cavity. As a result of these incisions the fillets are separated from the bones so that only the pin bones remain in the flesh before the sideways movement of the fillets.

Especially preferably, the separating gaps are widened from a longitudinal end of the fish, preferably starting from the tail end. Widening or enlargement of the separating gaps is preferably carried out in a wedge shape and continuously, starting from the longitudinal end so that the two lateral fillets, viewed in the swimming position of the fish, are pushed away horizontally and in a direction transverse to the spine and are thereby stripped from the bone structure and peeled away from the pin bones. In this case, lateral pushing away or lateral stripping of the fillets from the skeleton of the fish can take place at right angles or at an acute angle to its spine.

The introduced dorsal incisions end expediently above the pin bones so that the pin bones are not separated from the spine. Accordingly, the incisions cutting the flank bones free are preferably introduced from below such that they also extend only so far that the pin bones are not severed or separated.

Widening of the separating gaps for moving the fillets away laterally takes place further preferably in such a way that the fish in its longitudinal direction with a longitudinal end first, preferably with the tail end first, is pushed onto two fillet deflectors extending in the longitudinal direction and widening in a wedge shape in a direction transverse to this longitudinal direction, said deflectors entering the separating gaps formed by the incisions and widening them. If the fish is processed or filleted in its swimming position, the fillet deflectors are designed such that they widen wedge-shaped in an essentially horizontal plane, i.e. in a lateral direction transverse to the longitudinal bones and the spine of the fish.

Further preferably, the pin bones are guided in longitudinal slits or receiving grooves in the fillet deflectors during their infeed. The slits preferably extend over the length of the fillet deflectors and are opened at one, i.e. the front longitudinal end, which comes into contact with the fish first, such that the pin bones, when the fish and fillet deflectors are moved towards each other, enter the longitudinal slits during sideways movement of the fillets. Thus the pin bones are guided when they are drawn out of the fillets due to the sideways movement thereof. Thus breaking off of the pin bones can be prevented.

In addition to the method, an apparatus for mechanically recovering the flesh of fish or for filleting fish is also the subject-matter of the invention. The apparatus is particularly suitable for performing the method described above.

The apparatus according to the invention comprises a receiving device which is designed to receive and hold the fish to be processed. The receiving device may be designed in particular as a saddle on which the fish is placed with the opened abdominal cavity. In this case, the fish is preferably held and processed in the machine in its swimming position. It is also conceivable, however, to process the fish in a different position. Then the directional information specified in the following is to be understood as correspondingly rotated in relation to the swimming position. The apparatus according to the invention further comprises knives which are arranged and configured to introduce incisions that cut free the dorsal bones and the ventrally directed bones from the laterally located fillets. Such knife arrangements are known for mechanically filleting fish.

The apparatus further comprises two fillet deflectors, which are movable relative to the receiving device in such a way that they enter the separating gaps formed by the incisions and bring about a lateral movement of the fillets transverse to the dorsal bones of the fish and away from the spine. Viewed in the swimming position of the fish, the fillet deflectors thus bring about a movement of the fillets in the horizontal direction laterally away from the spine. For this purpose, a relative movement is necessary between the spine and the sides of the fillet deflectors directed towards the fillet which movement can be achieved either by a lateral movement of the fillet deflectors or by a corresponding wedge-shaped geometry of the fillet deflectors as is described below.

The fish is preferably moved through the apparatus. For this purpose, the receiving device is preferably movable for conveying the received fish in the longitudinal direction of said fish, i.e. in the direction of its spine.

In this case, the receiving device is further preferably movable relative to the knives in such a manner that the knives are guided through the flesh of the received fish. That is to say, the knives are arranged fixedly while the fish is moved in its longitudinal direction relative to the fixed knives. In this case, however, the knives may be rotating knives or cutting tools.

Further preferably, the knives are arranged and/or guided in such a manner that the pin bones extending laterally away from the spine or the flank bones of the fish are not severed by said knives. That is to say, the upper knives forming the dorsal incisions are arranged such that their lower edge ends above the pin bones. Correspondingly, the lower knives forming the incisions guided from the abdominal side are arranged such that their upper edges end below the pin bones. This ensures that the pin bones are not separated from the remaining skeleton.

The apparatus preferably comprises two dorsal knives spaced apart in parallel which are arranged and configured to introduce two dorsal incisions to the side of the dorsal bones of the fish such that said dorsal bones are cut free from the lateral fillets, wherein the dorsal knives are situated above the pin bones such that they are not severed. The dorsal knives are spaced apart laterally and preferably form incisions running not exactly parallel to each other. Rather, the incisions are preferably arranged at an acute angle to each other viewed in the vertical direction.

In addition, the apparatus preferably comprises knives which are arranged and configured to perform incisions guided from below, in particular two flank incisions cutting free the flank bones in the abdominal cavity region and two separating incisions reaching from the tail end up to the end of the abdominal cavity, extending in the longitudinal direction of the fish and cutting free the ventrally directed bones. Such knife arrangements for forming such incisions are basically well-known. According to the invention, however, it is preferable that the knives are arranged such that their incisions do not reach the pin bones and in particular do not sever them. That is to say, the knives are arranged such that the incisions end underneath the pin bones viewed in the swimming position of the fish.

Further preferably, the fillet deflectors and the receiving device are movable relative to each other in the longitudinal direction of a received fish, i.e. in the direction of its spine, the fillet deflectors preferably being arranged fixedly in the longitudinal direction. As a result of the relative movement, the fillet deflectors enter the incisions formed, as described above. There they bring about widening of the incisions, or the separating gaps formed by the incisions, such that the fillets are moved laterally away from the spine. This can take place by means of a sideways movement of the fillet deflectors.

The fillet deflectors are preferably designed to be wedge-shaped in such a manner that they widen starting from a first longitudinal end to a second longitudinal end transverse to the longitudinal direction. At the same time, the fillet deflectors widen in the transverse direction in which the fillets should be moved away from the spine, i.e. in a direction transverse to the dorsal bones which, in the swimming position of the fish, essentially corresponds to a horizontal direction. In this case, the first longitudinal end of the fillet deflectors is the front end which first enters the separating gap formed between bones and flesh. As the fish is advanced further onto the fillet deflectors, the separating gap is continuously widened due to their wedge-shaped form and the fillet is moved laterally away from the bones or the skeleton, the pin bones which are firmly connected to the remaining skeleton being gently drawn out of the fillet.

Especially preferably, the fillet deflectors widen by an amount which is greater than the length of the pin bones of the fish to be processed. This ensures that the fillet deflectors completely peel the fillets away from the pin bones. It is possible, however, to draw the pin bones completely out of the fillet even with less widening of the fillet deflectors if the pin bones are simultaneously deflected in the vertical direction which is possible, for example, by guiding the pin bones as described below.

The fillet deflectors are preferably each arranged downstream of at least one knife in an infeed direction of the fish and are preferably aligned with this knife. Thus the fish can be guided initially along the knives whereby the incisions described are introduced, and with further linear movement the fillet deflectors arranged downstream directly enter the incisions formed due to the aligned arrangement with the knives.

Furthermore, the fillet deflectors each expediently comprise a receiving groove running across the longitudinal extension of said fillet deflector and extending through said fillet deflector in its transverse extension transverse to the longitudinal extension which is arranged in such a manner that the pin bones are guided into the receiving groove during relative movement of the fish. That is to say, the receiving grooves extend completely through the fillet deflectors in the transverse direction such that the fillet deflector can be moved between fillet and spine, the pin bones, sitting firmly with one end on the spine or on the flank bones adjoining the spine and extending with their one end into the flesh, being able to extend through the receiving groove and through the fillet deflector. Thus the fillet deflector can move the fillet laterally away from the spine above and below the pin bones.

Further preferably, the receiving groove runs at an angle to the longitudinal extension of the fillet deflector in such a manner that, starting from a first longitudinal end of said fillet deflector, it moves away from a longitudinal axis in a direction perpendicular to the transverse extension, along which a fish received on the receiving device is moved with its spine relative to the fillet deflector. In this case, the receiving groove preferably runs upwards if the fish are processed in their swimming position. The effect of this is that, during infeed of the fish on the fillet deflector, the pin bones are simultaneously deflected, i.e. in particular are deflected upwards, in a direction perpendicular to the fillets' lateral direction of movement while the fillet is peeled away from the pin bones in a lateral direction. As a result, movement of the pin bones out of the fillet is improved and assisted.

According to a further preferred embodiment, a knife in the form of a flank scraper is arranged in each case laterally to the fillet deflectors, which knife, during a movement relative to a fish received on the receiving device, enters between the flank bones and the adjacent fillet in the region of the abdominal cavity of said fish and cuts the flank bones free from the fillet. Such flank scrapers are well-known. In the case of white fish for example, circular knives or scrapers of other shapes could be used instead of a flank scraper for cutting free the flank bones. According to the invention, they are preferably arranged laterally to the fillet deflectors in such a way that they are located on the outer sides of the two fillet deflectors directed away from each other. In this case, the front ends of the flank scrapers are preferably located upstream of the front first longitudinal ends of the fillet deflectors such that, in the region of the abdominal cavity, the flank scrapers enter the flesh first and thus separate the fillets from the flank bones, while the fillet deflectors are introduced subsequently and then move the fillet laterally away from the bones and thus also away from the flank bones.

BRIEF DESCRIPTION OF THE DRAWINGS

The invention will be described below in an exemplary manner based on the associated drawings. These show.

DETAILED DESCRIPTION OF EMBODIMENTS

Method and apparatus according to this patent are preferably realised by a fish processing machine for mechanically recovering the flesh of slaughtered fish with opened abdominal cavity. The fish to be processes are in particular fish species having pin bones extending from the spine into the flesh of the fish, for example salmon and white fish.

The fish is decapitated first of all. The then headless fish is transferred to the filleting process in which it is conveyed in the longitudinal direction, tail end first, through the further processing operations.

Firstly, incisions are introduced in the known manner between the dorsal bones and the bones extending ventrally and the fillet in order to cut these bones free from the fillet.

Figure 13:
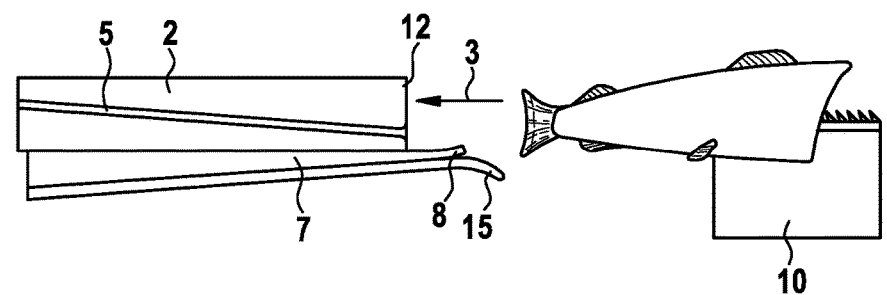

For this purpose, the fish in its swimming position is moved relative to the fixed, or if necessary rotating knives, through the machine or apparatus on a linearly movable saddle 10 (see FIG. 13).

Figure 1:
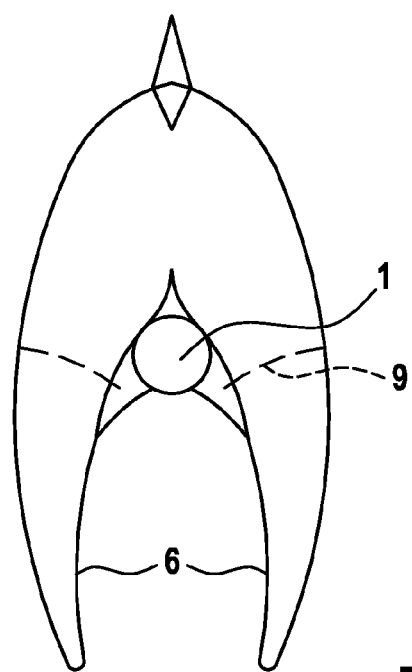
FIG. 1 a cross-section through the decapitated and slaughtered fish in the region of the abdominal cavity, FIG. 2 execution of the dorsal incision, FIG. 3 the effect of the fillet deflectors in the cutting grooves of the dorsal knives, FIG. 4 the effect of the fillet deflectors in the further course of processing, FIG. 5 the effect of the fillet deflectors in the further course of processing, FIG. 6 the effect of the fillet deflectors in the further course of processing, FIG. 7 a plan view onto the fillet deflectors, FIG. 8 the section C-D through the fillet deflectors according to FIG. 7, FIG. 9 the section E-F through the fillet deflectors according to FIG. 7, FIG. 10 the view A according to FIG. 7, FIG. 11 the view B according to FIG. 7, FIG. 12 the longitudinal view of a fillet deflector with flank scraper, and FIG. 13 feeding of a fish to the fillet deflector according to FIG. 12.

FIG. 1 shows a section through the fish in the region of the abdominal cavity in which the spine 1 and the pin bones 9 as well as the flank bones 6 located laterally to the abdominal cavity can be seen.

The dorsal spokes or bones of the fish are cut free in each case by means of incisions guided up to the spine 1 or the pin bone 9 that are made by rotating dorsal knives 4 arranged in pairs. In this case, the dorsal incisions thus formed end above the pin bones 9 such that said bones are not severed from the spine 1. Furthermore, ventral incisions are made in the known manner extending from the abdominal side up to the spine 1 and separating incisions from the tail end up to the end of the abdominal cavity.

Thus the fillets 11 are separated from the dorsal bones as well from the bones extending ventrally and the flank bones 6, the pin bones 9 remaining connected to the spine 1 or, in the case of white fish, remaining connected to the flank bones and initially still sticking in the fillets 11.

Further transport of the fish takes place in the opened abdominal cavity on both sides of the spinel supported on the saddle 10 with the tail end first. The fish now arrives in the spheres of action of two processing tools arranged on both sides of the movement path 3 of the spine 1, as illustrated in FIG. 13. As illustrated in FIG. 8-12, these tools are designed in the upper region as wedge-shaped fillet deflectors 2. The fillet deflectors 2 widen starting from a first longitudinal end 12 over their longitudinal extension in the longitudinal direction 3 which corresponds to the infeed direction of the fish along the fillet deflectors 2. In this case, the width direction in which the fillet deflectors 2 widen is a direction transverse to the direction of movement 3. That is to say, for the processing of fish in their swimming position shown here, the fillet deflectors 2 widen in the lateral horizontal direction. The first ends 12 form the ends which come into contact with the fish first and are therefore pointed in shape such that they can enter the incisions made previously or the separating gaps formed by the incisions. The increase in width becomes particularly obvious based on the incisions in FIGS. 8 and 9 which run along the lines C-D and E-F in FIG. 7. In their upper course, the fillet deflectors 2 are aligned with the separating gaps generated by the dorsal knives 4.

In the middle section, the fillet deflectors 2 each have a receiving groove 5 extending over the length of said fillet deflectors 2. The receiving grooves 5 in this case are inclined towards the transverse extension Y of the fillet deflectors 2 (see FIG. 9) and preferably have a width b between 1-3 mm, but if necessary may also be designed wider. In this case, the receiving grooves 5, starting from the inner sides 13 of the two fillet deflectors 2 directed towards each other, are each inclined upwards towards the outer side 14 of said fillet deflectors 2. The receiving grooves 5 thus extend completely through the fillet deflectors 2 in the transverse extension of said fillet deflectors. In this case, the downward or upward slope to the transverse axis Y increases, starting from the first longitudinal end 12 of the fillet deflectors 2, such that on the outer sides 14 of said fillet deflectors 2 shown in FIGS. 10 and 11 the result is a vertically ascending course of receiving grooves 5. Flank scrapers 7, which are provided with a blade 8 in their section opposing the direction of movement 3 of the fish, are arranged in each case in the lower region lateral to the outer sides 14 of the fillet deflectors.

The flank scrapers 7 enter with their blade 8 in the region of the abdominal cavity between the flank bones 6 and the fillet 11 and thus scrape the fillet 11 off the flank bones 6. In this case, the flank bones 6 are guided between the flank scraper 7 and a counter surface 15 running adjacent to the scraper knife or flank scraper 7. The blade 8 of the flank scraper 7 is located upstream of the first longitudinal end 12 of the fillet deflector 2 such that initially the blade 8 enters the flesh before the first longitudinal end 12 of the fillet deflector 2 enters the incisions formed between bones and fillets 11. Other cutting devices, such as circular knives, may also be used instead of such flank scrapers to cut free the flank bones.

While the fish on the saddle 10 is pushed further through the processing section tail first, the bilateral fillet deflectors 2 then penetrate into the cutting grooves generated by the dorsal knives 4 and widen said grooves continuously in a wedge shape due to their described wedge-shaped form. At the same time, the blade 8 penetrates further into the flesh of the fish just above the flank bones 6. As the process continues, the flank scraper 7 rests on the flank bones 6 and then slides along them. As the processing continues, the fillet deflectors 2 then also enter the flank incisions or separating incisions thus formed between the fillet 11 and the flank bones 6. In the tail end region, i.e. between tail end and abdominal cavity, the fillet deflectors 2 have previously entered the separating incisions formed laterally to the ventral bones which are formed from the underside with knives not shown here. In the process, the lower cutting grooves arising due to the separating incisions are also widened in a wedge shape and continuously in the longitudinal direction of the fish.

In this case, the pin bones 9 move within the receiving grooves 5. As the process continues, both lateral fillets 11, viewed in the swimming position of the fish, are completely pushed away horizontally and laterally in a direction Y transverse to the spine 1 and are thereby stripped from the bone structure or skeleton and peeled away from the pin bones 9.

Figure 2:
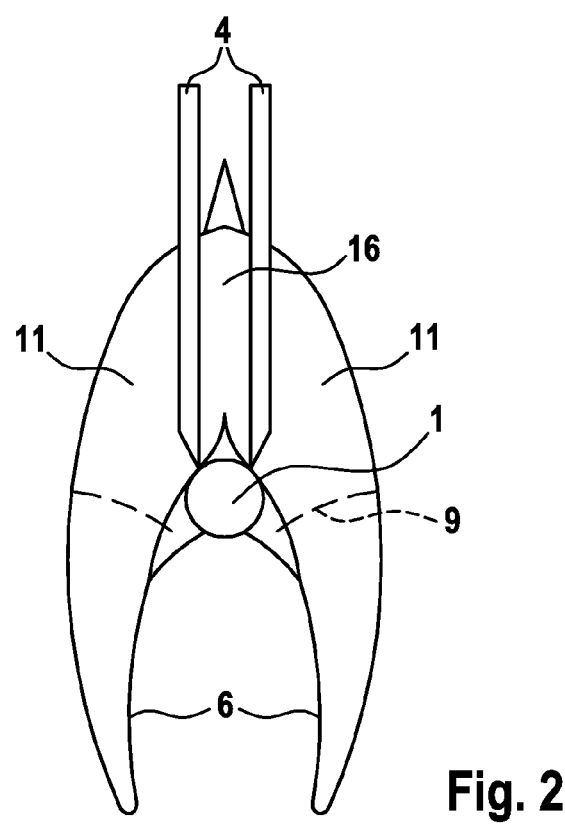
Figure 3:
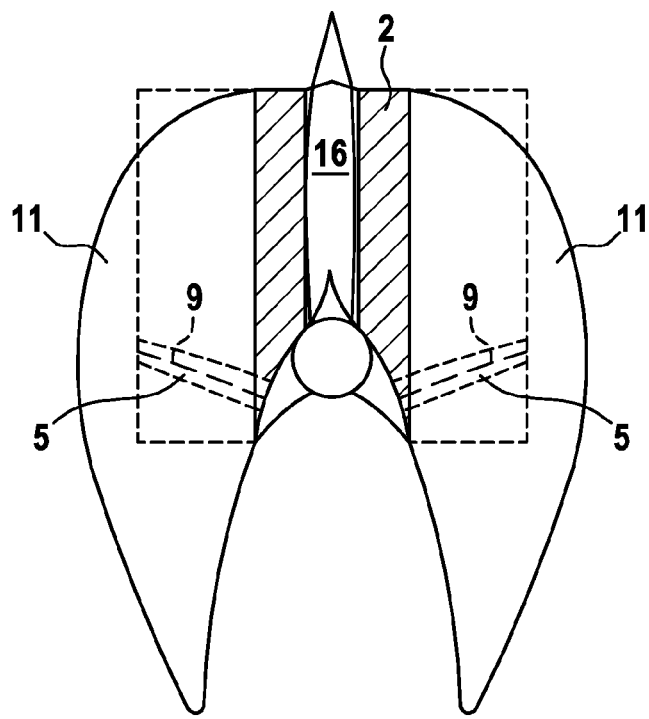
Figure 4:
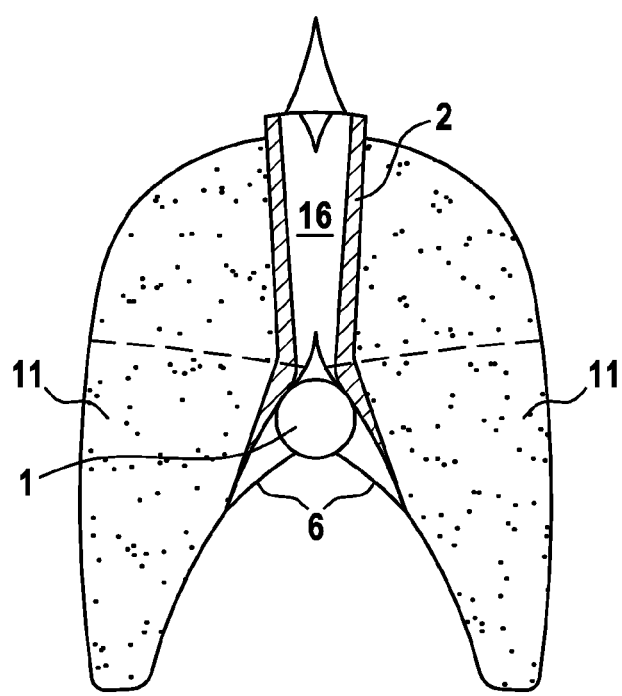
Figure 5:
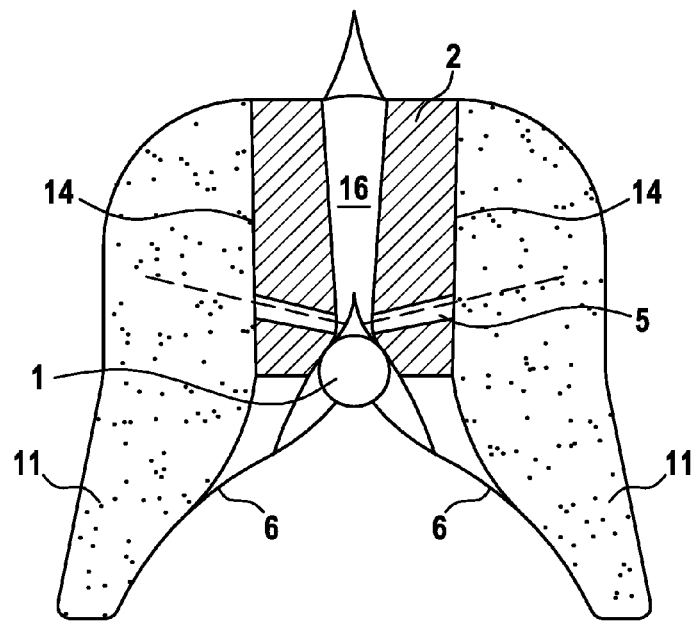
Figure 6:
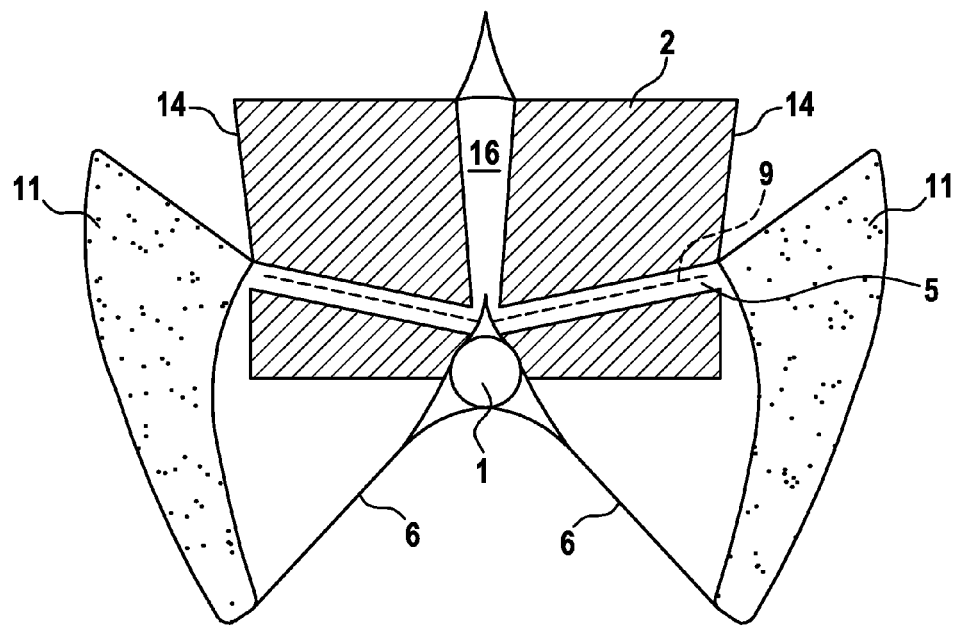
Figure 9:
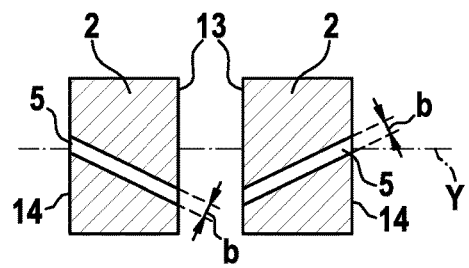
Figure 8:
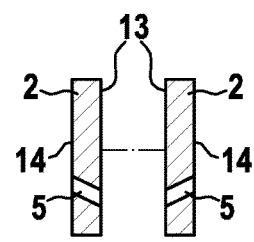
Figures 7, 10, 11:
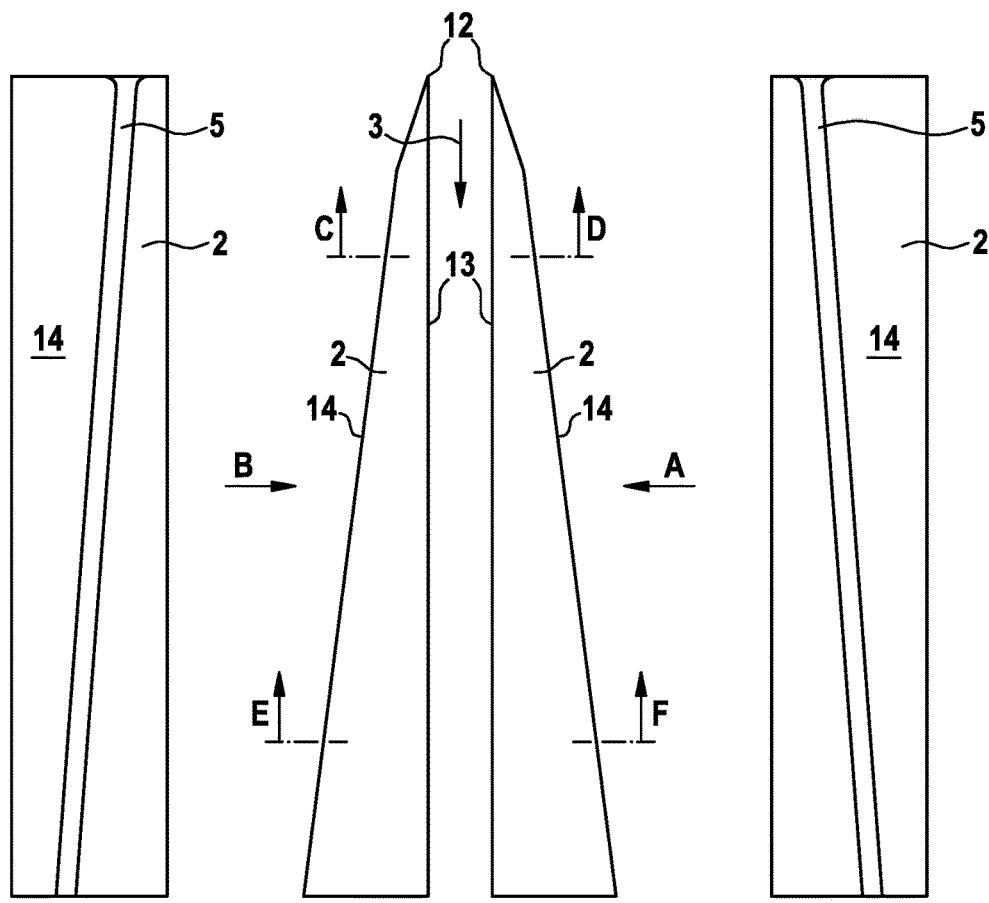
Figure 12:
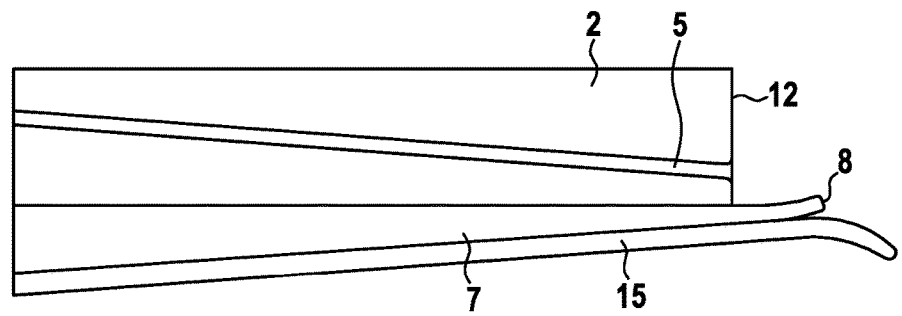

Widening can be seen based on the cross-section of the fish in the region of the abdominal cavity shown in FIGS. 1-6. The cross-section in this case is located in the same position in the fish. After introducing the incisions which are illustrated in FIG. 2, the fillet deflectors 2 penetrate in the incisions or separating gaps formed by the knives 4 such that the backbone 16 is located between said fillet deflectors 2. The ventral bones in the region of the tail end also not shown here are correspondingly located between the fillet deflectors 2. The fillet deflectors 2 rest with their outer sides 14 against the inner sides of the fillets 11 (see FIGS. 5 and 6) and push the fillets apart and away from the spine 1 and the backbone 16. The pin bones 9 are guided at the same time into the receiving grooves, whereupon they are again deflected upwards due to the inclined course of said receiving grooves 5, as illustrated in FIGS. 10 and 11, as a result of which the movement of pulling the pin bones 9 out of the fillets 11 is further assisted which is not, however, illustrated in FIGS. 5 and 6.

LIST OF REFERENCE NUMBERS

1—Spine
2—Fillet deflector
3—Direction of movement
4—Dorsal knives
5—Receiving grooves
6—Flank bones 7—Flank scraper
8—Blade
9—Pin bones
10—Saddle
11—Fillets
12—First longitudinal end of the fillet deflector 2
13—Inner sides
14—Outer sides
15—Counter-surface
16—Dorsal bones
b—Width
Y—Transverse direction

The invention claimed is:

1. A method for mechanically recovering flesh from fish, wherein at least a first and a second incision are introduced in the fish thereby forming separating gaps, wherein the dorsal bones and the ventrally directed bones are cut free from the laterally located fillets without separating the pin bones from the spine and the separating gaps formed by the incisions are then expanded, thereby moving the lateral fillets away from the spine of the fish in the lateral direction transverse to the dorsal bones, wherein the fillets are peeled away from the pin bones extending laterally out from the spine or the flank bones.

2. The method according to claim 1, wherein two dorsal incisions extending in the longitudinal direction of the fish, cutting free the dorsal bone in the region of the fish back, two flank incisions cutting free the flank bones in the region of the abdominal cavity and two separating incisions reaching from the tail end up to the end of the abdominal cavity, extending in the longitudinal direction of the fish and cutting free one or more ventrally directed bones are introduced as incisions.

3. The method according to claim 1, wherein the separating gaps are expanded starting from the tail end of the fish.

4. The method according to claim 1, wherein the dorsal incisions end above the pin bones.

5. The method according to claim 1, wherein the fillets are moved in a lateral direction transverse to the dorsal bones and to the spine away from said bones.

6. The method according to claim 1, wherein the fillets are moved in a lateral direction at an acute angle to the spine away from said spine.

7. The method according to claim 1, wherein the fish in its longitudinal direction is pushed with one longitudinal end first onto two wedge-shaped fillet deflectors extending longitudinally and expanding in a direction transverse to this longitudinal direction, said deflectors thus entering the separating gaps formed by the incisions and widening them.

8. The method according to claim 7, wherein the pin bones are guided in longitudinal slits in the fillet deflectors during their infeed.

9. An apparatus for mechanically recovering flesh from fish comprising
a receiving device designed to receive and hold the fish to be processed, knives arranged and configured to introduce incisions that cut free the dorsal bones and the ventrally directed bones from the laterally located fillets, and two fillet deflectors that are movable relative to the receiving device in such a way that they enter separating gaps formed by the incisions and bring about a lateral movement of the fillets transverse to the dorsal bones of the fish and away from the spine.

10. The apparatus according to claim 9, wherein the receiving device is movable for conveying the received fish in its longitudinal direction.

11. The apparatus according to claim 9, wherein the receiving device is movable relative to the knives in such a way that the knives are guided through the flesh of the received fish.

12. The apparatus according to claim 9, wherein the knives are arranged and/or guided in such a manner that the pin bones extending laterally out from the spine or the flank bones of the fish are severed by said knives.

13. The apparatus according to claim 9, comprising two dorsal knives spaced apart which are arranged and configured to introduce two dorsal incisions laterally to the dorsal bones of the fish such that said dorsal bones are cut free from the lateral fillets, wherein the dorsal knives are situated above the pin bones such that they are not severed.

14. The apparatus according to claim 9, comprising knives which are arranged and configured to perform incisions guided from below, in particular two flank incisions cutting free the flank bones in the abdominal cavity region and two separating incisions reaching from the tail end up to the end of the abdominal cavity, extending in the longitudinal direction of the fish and cutting free the ventrally directed bones.

15. The apparatus according to claim 9, wherein the fillet deflectors and the receiving device are movable relative to each other in the longitudinal direction of a received fish, the fillet deflectors preferably being arranged fixedly in the longitudinal direction.

16. The apparatus according to claim 9, wherein the fillet deflectors are designed to be wedge-shaped in such a manner that they widen starting from a first longitudinal end to a second longitudinal end transverse to the longitudinal direction.

17. The apparatus according to claim 16, wherein the fillet deflectors widen by an amount which is greater than the length of the pin bones of the fish to be processed.

18. The apparatus according to claim 9, wherein the fillet deflectors are each arranged downstream of at least one knife in an infeed direction of the fish and are preferably aligned with this knife.

19. The apparatus according to claim 9, wherein the fillet deflectors each comprise a receiving groove running across a longitudinal extension of said fillet deflector and extending through said fillet deflector in its transverse extension transverse to the longitudinal extension which is arranged in such a manner that the pin bones are guided into a receiving groove during relative movement of the fish.

20. The apparatus according to claim 19, wherein the receiving groove runs at an angle to the longitudinal extension of the fillet deflector in such a manner that, starting from a first longitudinal end of said fillet deflector, it moves away from a longitudinal axis in a direction perpendicular to the transverse extension, along which a fish received on the receiving device is moved with its spine relative to the fillet deflector.

21. The apparatus according to claim 9, wherein a knife in the form of a flank scraper is arranged in each case laterally to the fillet deflectors, which knife, during a movement relative to a fish received on the receiving device, enters between the flank bones and the adjacent fillet in the region of the abdominal cavity of said fish and cuts the flank bones free from the fillet.

* * * * *